July 2, 1946.  R. D. ACTON  2,403,322

CLUTCH STRUCTURE FOR CRAWLER TRACTORS

Filed Jan. 26, 1944  2 Sheets-Sheet 1

Inventor:
Russel D. Acton.
By Paul O. Pippel
Atty.

July 2, 1946.　　　　R. D. ACTON　　　　2,403,322
CLUTCH STRUCTURE FOR CRAWLER TRACTORS
Filed June 26, 1944　　　2 Sheets-Sheet 2
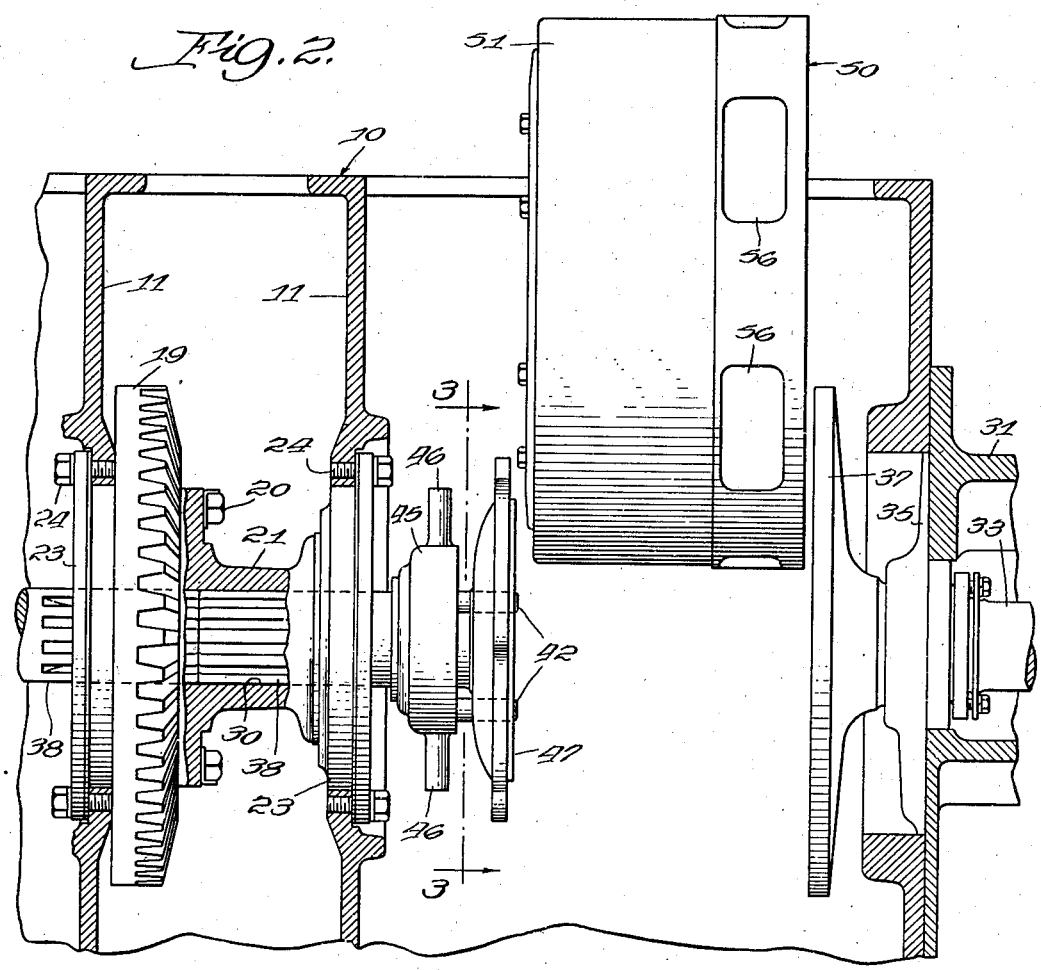
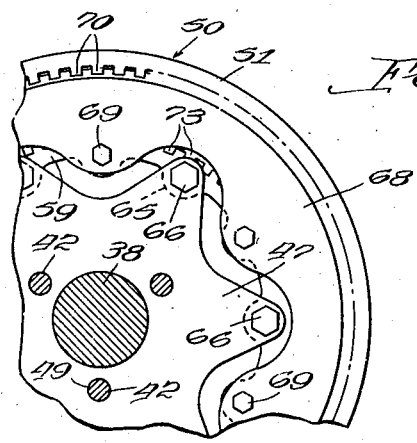
Inventor:
Russel D. Acton.
By Paul O. Pippel
Atty.

Patented July 2, 1946

2,403,322

UNITED STATES PATENT OFFICE 2,403,322

CLUTCH STRUCTURE FOR CRAWLER TRACTORS

Russel D. Acton, Chicago, Ill., assignor to International Harvester Company, a corporation of New Jersey Application June 26, 1944, Serial No. 542,143

13 Claims. (Cl. 192—69)

This invention relates to a clutch. More specifically, it relates to a clutch device for the steering mechanism of a track-laying type of tractor. In the conventional track-laying tractors in exclusive use at the present time, steering is accomplished by disconnecting the power drive from one of the tracks. This is accomplished by a clutch which is disengaged to discontinue the application of power. The final drive mechanism includes a pair of steering clutch units which may be selectively controlled by the operator for steering the tractor. In the larger sizes of such tractors, these steering clutches are of the multiple disk type and are of considerable size and weight. As a consequence, the removal of clutches for repairs and service is a major consideration in the design of these tractors. The hard and continuous use to which these tractors are subjected requires frequent servicing of the clutch units. It is desirable, therefore, to provide an assembly which will make the task of removing the clutches simple, easy and time saving without requiring the removal or adjustment of other collateral parts of the tractor and the tractor drive mechanism.

In prior art devices such as shown in the Baker et al. Patent 2,197,289, constructions have been provided which facilitate removal of the clutch device and its associated parts through an opening in the body or transmission housing of the tractor. The present invention relates to an improvement in a removable type of clutch construction as shown in said patent.

The principal object of this invention is to provide an improved clutch device which permits removal from a power transmission line without altering the driving and driven members.

Another important object is to provide an improved clutch assembly of the multiple plate type which has two spaced attaching faces to which driving and driven members may be readily secured by bolting whereby the clutch device may be readily removed.

Another object is to provide a removable clutch construction to be inserted between the driving and driven members in which axial alinement of the driving and driven members has a minimum effect upon the clutch device and its component parts.

Another object is to provide a removable clutch device with a throw-out mechanism which remains on the driven member when the clutch is removed from its operative position.

Briefly the above defined and other desirable objects may be achieved as illustrated in one preferred embodiment of the invention, in which a track-laying tractor has a body portion formed with a clutch compartment and a power input compartment housing a drive pinion and a bevel gear, said gear being carried by a rotatably mounted internally splined driving member. A splined shaft slidably mounted in said member provides the necessary endwise movement required for separating an attaching flange and a clutch assembly, whereby the clutch may be unbolted from the flange and from a flange on a driving member and removed from the clutch compartment.

In the drawings:

Figure 2 is a vertical section showing a substantial portion of the structure of Figure 1 with the clutch device in partially removed position; and Figure 3 is a sectional view taken on the line 3—3 of Figure 2.

Figure 1:
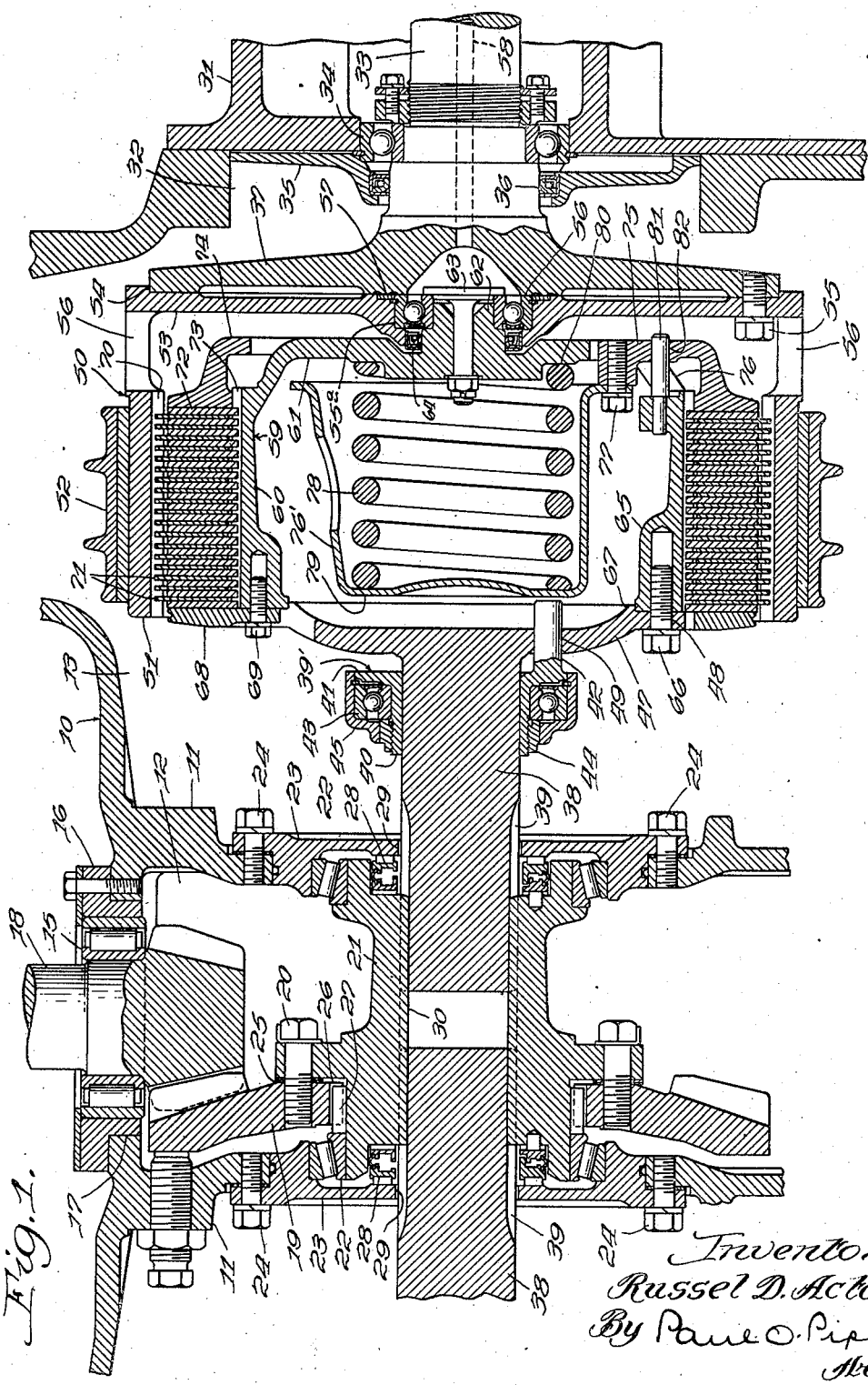
Figure 1 is a horizontal sectional view taken through the rear body or frame housing of a crawler tractor, showing a center gear compartment, a clutch compartment, and a portion of a final drive housing.

The Baker et al. patent previously referred to shows a substantial portion of a track-laying tractor of the type for which the clutch device of this invention was designed. The rear body of the tractor, which may be considered as the tractor frame and also as a housing for the drive mechanism, is shown only sufficiently to show the mounting and positioning of the power input and the power output shafts. The tractor body 10 as illustrated is provided with spaced walls 11 which form a lubricant contained gearing compartment 12 which in a tractor construction is midway of the two steering clutch compartments 13. A bearing assembly 15 is illustrated as supported in a holder assembly 16 fitted into an opening 17 in the housing 10.

A power input means in the form of a pinion shaft 18 is mounted in the bearing assembly 15 meshing with a bevel gear 19, which is rigidly secured by cap screws 20 to a driving member 21. Said driving member is carried by bearing assemblies 22 at the ends thereof in members 23 which are rigidly secured by cap screws 24 to the walls 11 of the gear compartment previously referred to. The gear 19 is held in position by the cap screws 20, shims 25 being provided for adjusting the gear with respect to the pinion. The driving force is transmitted from the gear 19 to the driving member 21 by internal teeth 26 on the gear 19 and external teeth 27 on the member 21. Oil-sealed assemblies 28 fitted into recesses formed in the ends of the member 21 abut the inside walls of the members 23 to seal the gear compartment and to provide an oil-tight reservoir.

The members 23 are provided with openings 29 slightly larger in diameter than the diameter of a splined bore 30 extending through the member 21.

A portion of a final drive housing 31 is shown as secured to a portion of the housing 10 over an opening 32 formed therein concentric with the axis of the driving member 21. A drive shaft 33 located in the final drive housing 31 is rotatably supported by a ball bearing assembly 34. An annular member 35 fitted in the opening 32 carries a seal 36 which forms an oil-tight compartment in the final drive housing 31. The shaft 33 is provided with a disk-like extension or flange 37 located in the clutch compartment 13 adjacent the final drive housing.

The portions of the track-laying tractor described up to this point constitute the means for delivering power to an internally splined driving member and for taking off power from a flange-driven member. It is in cooperation with these two elements that the clutch construction of this invention functions. A shaft 38 is provided with a splined end 39 which slidably fits in the internally splined bore of the driving member 21. It will be noted that with the clutch in operative position, the inner end of the shaft is spaced a substantial distance from the center of the member 21. It will be understood that with both shafts spaced as shown, either shaft may be moved endwise the entire distance between their spaced ends. Figure 2 shows how the shafts may be abutted together during removal of either one of the clutches.

The shaft 38 is provided with a smooth portion beyond the splined end 39 on which a clutch throw-out assembly is mounted. Said assembly includes a member 39' having a sleeve 40 slidable on the shaft 38 and an annular extension 41 extending from one end of the sleeve. A plurality of clutch disengaging elements or fingers 42 circular in cross-section project from the flange 41 for a purpose to be hereinafter described. A ball bearing assembly 43 is mounted on the sleeve 40 being held against displacement thereof by a collar 44 threaded on the sleeve 40. A second clutch member 45 secured to the outer race of the ball bearing assembly is provided with a pair of diametrically extending trunnions 46, by means of which the clutch throw-out assembly may be moved axially of the shaft 38 by any conventional throw-out mechanism, it being understood that the member 45 is held against rotation with respect to the shaft 38, this being permitted by the ball bearing assembly 43.

The shaft 38 is provided opposite its splined end with a disk-like extension or flange 47, which is provided with a plurality of circumferentially spaced openings 48 around its periphery. The clutch disengaging elements 42 previously referred to extend through openings 49 formed in the flange 47.

An outer drum structure 50 has a cylindrical portion 51, the surface of which is machined to form a brake drum for a band type brake 52. Said brake may be actuated by any suitable means such as shown in the patent previously referred to. The drum structure 50, in addition to the cylindrical portion, has a circular or disk-like portion 53 which abuts against the flange 37 being provided with a center shoulder 54. The drum structure is secured to said flange by a plurality of cap screws 55, which may be reached for removal through openings 56 provided in the cylindrical portion of the drum structure adjacent the circular end portion.

At its center the end portion 53 of the drum structure 50 is provided with a shallow bore 55ᵃ in which a ball bearing assembly 56 is secured. An oil seal 57 between the end portion 53 adjacent the bearing assembly 56 abuts an adjacent portion of the flange 37 to prevent the escape of lubricant. As shown by a bore 58 in the shaft 33, lubricant is supplied to the ball-bearing assembly from the final drive housing.

An inner drum structure 59 is formed with a cylindrical portion 60 and a disk-like end portion 61. Said end portion is provided with an extension boss 62 on which the ball-bearing assembly 56 is seated, being secured thereto by a headed clamping member 63 which extends through the end portion 61. An oil seal 64 is fitted between the extension boss 62 and the adjacent portion of the end portion 53 of the drum structure 50.

The cylindrical portion 60 of the inner drum structure 59 is provided with bosses 65 to provide reenforcements for cap screws 66 which secure the flange 47 rigidly to the inner drum structure, a shoulder 67 being formed on the inner face of the flange 47 to accurately center the inner drum structure coaxial with the shaft 38.

As best shown in the upper portion of Figure 1, an annular clutch plate securing member 68 is rigidly secured by cap screws 69 to the end of the circular portion 61 of the inner drum structure 59. As shown in Figure 3, the annular member has extension lugs wherein the cap screws 69 are located in order to provide space for the cap screws 66 which secure the flange 47 to the inner drum structure. Inspection of Figure 3 will also show that scallops are formed in the flange 47 to provide space for the securing lugs or extensions on the member 68. This construction permits unbolting and removal of the flange 47 without removing the member 68. This is necessary as the clutch plates are under compression when the clutch is removed from the tractor. The outer drum structure 50 is provided with internal teeth 70, which engage notches formed in a plurality of metallic clutch plates 71. Such plates alternate with a plurality of clutch plates 72, formed of any suitable clutch facing material, which are provided with a plurality of notches engaging external teeth 73 formed on the outside of the inner drum structure 59. The clutch plates abut the member 68 at one end and are packed into contacting position by a packing member 74 at the other end. The packing member 74 extends a sufficient distance axially from the cylindrical portion of the drum structure 59 to provide for maximum wear of the clutch plates before removal and replacement. Said packing member beyond this clearance distance is provided with radial inward extensions 75, a plurality of which may be utilized. Clearance is provided for said extensions by openings 76 formed around the end wall or face 61 of the inner drum structure. Within the drum structure a spring-retaining member 76', cup-like in its general formation, is secured by cap screws 77 to the extensions 75. A compression spring 78 abuts the inside end wall 79 of the member 76' and a seat 80 formed around the inside surface of the end wall 61. It will be understood that the compression spring acts through the extensions 75 to urge the plates into contact and to maintain them in engaging position. A guide member in the form of a pin 81 rigidly secured to the inner drum structure 59 extends through a bore 82 formed in one of the extensions 75 to hold the packing member 74 against rotation relative to the inner drum structure 59.

In the operation of the structure as above described, power is transmitted through the driving member 21 to the shaft 38, the flange 47, and the inner drum structure 59 through the clutch plates 71 and 72 to the outer drum structure 50 and therefrom to the driven shaft 33. By actuation of the clutch throw-out assembly, the fingers 42 abut the outer end wall of the member 76 compressing the spring 78 and moving the packing member 74 away from the clutch plates, whereby the application of power through the clutch is discontinued. The brake 52 may also be applied, if necessary, to obtain short turn steering or braking. It will be understood that in manufacturing operations on large castings as utilized for the frames of crawler tractors, it is very difficult to maintain all the bores in absolute concentricity and to maintain all the flat surfaces on which seats are formed in parallelism and at right angles to the bores. For that reason and due also to distortion in the frame upon the imposition of extremely heavy loads, there is apt to be considerable misalinement between the driving member 21 and the driven member 33. In the construction of this invention, it will be seen that the possible wobble due to such misalinement is reduced to a minimum. The splined shaft 38 is connected to the member 21 very close to its center, and the pilot bearing for the complete inner drum structure and driving member 38 is located as close to the driven member 33 as possible, while at the same time permitting removal of the clutch assembly. It will also be understood that the separable joints between the clutch assembly and the driving and driven members are of such a nature that they may be easily and accurately made and removed and connected without the danger of misalinement. The spline within the member 21 may have sufficient clearance to permit slight eccentricity and misalinement of the driving and driven members. The connection between the flange 47 and the inner drum structure is of a large radius, whereby the torque may be easily transmitted through attaching bolts and whereby parallelism may be readily maintained. The same is true of the connection between the flange 37 and the outer drum structure.

In removing the clutch assembly as shown in Figure 2, it is merely necessary to remove the cap screws 55 and 66 and slide the shaft 38 into the splined member 21. The brake band may then be removed, and the clutch device may be taken out through an opening in the frame housing, as shown in Figure 2. As previously stated, it is not necessary to remove oil from the gear chamber 12 or to disturb the adjustment of the bearings or seals for said member.

It is applicant's intention to claim as his invention in this application all the novel features of the clutch construction and all the equivalent constructions. The details of the driven member compartment and the mounting of the members and seals therein are not claimed as this construction is the subject in the copending application Serial No. 542,142, filed June 26, 1944. Likewise, the pilot bearing construction and its seals and lubricating means are not claimed as these features are the subject-matter of the copending application.

What is claimed is:

1. A clutch device adapted to be positioned in a power transmitting construction having an internally splined driving member and a driven member formed with an attaching portion comprising, a splined shaft slidably fitted in said splined member, said shaft being formed with an attaching flange, a removable clutch unit including a plurality of clutch plates, an outer drum structure to which alternate clutch plates are drivingly connected and an inner drum structure to which alternate plates are drivingly connected, means for connecting the flange on the splined shaft to the inner drum structure, means for connecting the outer drum to the attaching portion on the driven member, releasable means within said drum structures for urging said plates together, and clutch operating means including a member supported around said shaft outside the drum structure and actuating means associated with said member and extending through the attaching flange on the splined shaft into operative relationship with said releasable means.

2. A clutch device for a power transmitting device having an internally splined driving member and a driven member formed with an attaching flange comprising, a splined shaft slidably fitted in said splined member, said shaft being formed with an attaching flange, a clutch actuating structure including a member surrounding said shaft and an associated clutch actuating element movably extending through the flange, a removable clutch unit including a plurality of clutch plates, an outer drum structure to which alternate clutch plates are drivingly connected and an inner drum structure to which alternate plates are drivingly connected, means for connecting the flange on the splined shaft to the inner drum structure, means for connecting the outer drum structure to the flange of the driven member, and means for urging said clutch plates together, said clutch actuating element being constructed and arranged for engagement with the means for urging the clutch plates together to overcome said means and release pressure on the clutch plates by movement of the clutch actuating element in one direction.

3. A clutch device for a power transmitting device having an internally splined driving member and a driven member formed with an attaching flange comprising, a splined shaft slidably fitted in said splined member, said shaft being formed with an attaching flange formed with circumferentially spaced openings, a clutch actuating structure including a member slidably mounted on said shaft and associated clutch actuating elements slidably extending through the openings in the flange, a removable clutch unit including a plurality of clutch plates, an outer drum structure to which alternate clutch plates are drivingly connected and an inner drum structure to which alternate plates are drivingly connected, means for connecting the flange on the splined shaft to the inner drum structure, and means for connecting the outer drum structure to the flange of the driven member, means for urging the clutch plates together, said clutch actuating element being constructed and arranged for engagement with the means for urging the clutch plates together to overcome said means and release pressure on the clutch plates by movement of the clutch actuating element in one direction.

4. A clutch device adapted to be positioned in a power transmitting construction having a rotatably supported internally splined driving member and a driven member formed with an attaching portion comprising, a splined shaft slidably fitted in said splined member, said shaft being formed with an attaching flange which forms the terminal end of the shaft, a removable clutch unit including a plurality of clutch plates, an outer drum structure to which alternate clutch plates are drivingly connected, an inner drum structure to which alternate plates are drivingly connected and resilient means for urging said plates into driving contact, said inner drum structure being journaled in said outer drum structure, means for rigidly and detachably connecting the flange on the splined shaft to the inner drum structure, said drum structures and said attaching flange forming a hollow drum unobstructed in its central portion, and clutch operating means including means extending into said drum for overcoming said resilient means, and means for rigidly and detachably connecting the outer drum structure to the attaching portion of the driven member.

5. A clutch device adapted to be positioned in a power transmitting construction having an internally splined driving member and a driven member formed with an attaching flange comprising, a splined shaft slidably fitted in said splined member, said shaft being formed with an attaching flange which forms the terminal end of said shaft, a removable clutch unit including a plurality of clutch plates, an outer drum structure having a circular end portion and a cylindrical peripheral portion to which alternate clutch plates are drivingly connected and an inner drum structure having a circular end portion journaled in the end portion of the outer drum and a cylindrical peripheral portion to which alternate plates are drivingly connected, means for connecting the flange on the splined shaft to the peripheral portion of the inner drum structure at the end thereof opposite the circular end portion whereby applied torque on the driving member is applied through said flange directly to said peripheral portion of the inner drum structure, means for connecting the peripheral portion of the outer drum structure to the flanged driven member, and resilient means for urging said plates together.

6. A clutch device for a power transmitting device having an internally splined driving member and a driven member formed with an attaching flange comprising, a splined shaft slidably fitted in said splined member, said shaft being formed with an attaching flange, a clutch actuating structure slidably mounted on said shaft, said structure having clutch actuating elements slidably extending through the flange, a removable clutch unit including a plurality of clutch plates, an outer drum structure to which alternate clutch plates are drivingly connected, an inner drum structure to which alternate plates are drivingly connected, means for connecting the flange on the splined shaft to the inner drum structure, means for connecting the outer drum structure to the flange of the driven member, and means carried by the inner drum structure for resiliently urging the clutch plates into driving relationship.

7. A clutch device for a power transmitting device having an internally splined driving member and a driven member formed with an attaching flange comprising, a splined shaft slidably fitted in said splined member, said shaft being formed with an attaching flange, a clutch actuating structure slidably mounted on said shaft, said structure having clutch actuating elements slidably extending through the flange, a removable clutch unit including a plurality of clutch plates, an outer drum structure to which alternate clutch plates are drivingly connected, an inner drum structure to which alternate plates are drivingly connected, a retainer member secured to said drum structure at one end thereof, a plate packing member mounted for axial movement at the other end of said drum structure, spring means mounted within said drum structure, force transmitting means connecting said spring to the packing member, said clutch actuating elements being engageable with said force transmitting means, means for connecting the flange on the splined shaft to the inner drum structure, and means for connecting the outer drum structure to the flange of the driven member.

8. A steering clutch for crawler type tractors having a body structure provided with a gear compartment, a clutch compartment, an internally splined driving member in the gear compartment and a driven member formed with an attaching flange in the clutch compartment comprising, a splined shaft slidably fitted in said splined member, said shaft being formed with an attaching flange, said flanges being variably spaced by axial sliding movement of the splined shaft, a removable clutch unit including a plurality of clutch plates, an outer drum structure to which alternate clutch plates are drivingly connected, an inner drum structure to which alternate clutch plates are drivingly connected, means for detachably connecting the flange on the splined shaft to the inner drum structure, said inner drum structure and said flange forming a hollow rigid drum unobstructed in its interior, means for detachably connecting the outer drum to the flange on the driven member, and resilient means carried within the hollow drum for urging said plates together.

9. A steering clutch for crawler type tractors having a body structure provided with a gear compartment and a clutch compartment, an internally splined driving member in the gear compartment and a driven member formed with an attaching flange in the clutch compartment comprising, a splined shaft slidably fitted in said splined member, said shaft being formed with an attaching flange, a clutch actuating structure slidably mounted on said shaft, said structure having clutch actuating fingers slidably extending through the flange, a removable clutch unit including a plurality of clutch plates, an outer drum structure to which alternate clutch plates are drivingly connected, an inner drum structure to which alternate clutch plates are drivingly connected, means for detachably connecting the flange on the splined shaft to the inner drum structure, means for detachably connecting the outer drum to the flange on the driven member, and resilient means carried by one of the drum structures for urging said plates together.

10. In a removable steering clutch construction for track-laying tractors, a body portion for the tractor formed with a steering clutch compartment, a driven member mounted in the body portion of the tractor and having a disklike flange located within and at one side of said compartment, an internally splined driving member mounted adjacent and outside the other side of the compartment, said compartment being provided with an opening adjacent said driving member for access thereto, a driving shaft slidably mounted for axial movement in said splined driving member, said shaft having a flanged end in the compartment, a hollow drumlike structure secured to the flanged shaft, a second drumlike structure surrounding said first structure spaced radially therefrom, said structures having driving teeth respectively on the outer surface of the inner structure and the inner surface of the outer structure, a plurality of clutch plates mounted between said drumlike structures being alternately engaged with the drum structures, an annular securing member for holding the plates in position at the attaching end of the inner drum structure, a clutch disk packing structure, a spring retaining member mounted within the inner drum structure and secured to said packing structure, a spring abutting said member and the inner axial face of said inner drum structure, said outer drum structure being removably secured to the flanged driven member for permitting removal of the clutch assembly, said inner drum structure being provided with a portion journaled in the axial face portion of the outer drum structure to provide a pilot bearing.

11. In a removable steering clutch construction for track-laying tractors, a body portion for the tractor formed with a steering clutch compartment, a driven member mounted in the body portion of the tractor and having a disklike flange located within and at one side of said compartment, an internally splined driving member mounted adjacent and outside the other side of the compartment, said compartment being provided with an opening adjacent said driving member for access thereto, a driving shaft slidably mounted for axial movement in said splined driving member, said shaft having a flanged end in the compartment, a hollow drumlike structure secured to the flanged shaft, a second drumlike structure surrounding said first structure spaced radially therefrom, said structures having driving teeth respectively on the outer surface of the inner structure and the inner surface of the outer structure, a plurality of clutch plates mounted between said drum structures being alternately engaged with the respective drum structures, an annular securing member for holding the plates in position at the attaching end of the inner drum structure, said member having spaced lugs for attachment to the drum structure and the flange on the shaft having spaced cut-away portions to accommodate said lugs whereby the flange can be removed from the drum structure for removal of the clutch assembly without removing the clutch plate securing member, a clutch disk packing structure including an annular member engageable with the clutch plates and portions extending radially inwardly, said inner drum structure being provided with openings through which said portions project, a spring retaining member mounted within the inner drum structure and secured to said portions, and a spring abutting said member and the inner axial face of the drum structure, said outer drum structure being removably secured to the flanged driven member for permitting removal of the clutch assembly, said inner drum structure being provided with a portion journaled in the axial face portion of the outer drum structure to provide a pilot bearing.

12. In a removable clutch construction for track-laying tractors, a body portion for the tractor formed with a steering clutch compartment, a driven member mounted in the body portion of the tractor and having a flange located within and at one side of said compartment, an internally splined driving member mounted adjacent and outside the other side of the compartment, said compartment being provided with an opening adjacent said driving member for access thereto, a driving shaft slidably mounted for axial movement in said splined driving member, said shaft having a flanged end in the compartment, a clutch throw-out structure mounted on said shaft, said structure having one portion slidably mounted on the shaft in axial direction and held for rotation with the shaft, the means for holding said portion against rotation being clutch actuating elements extending through the flange on the shaft, said clutch throw-out structure including a ball-bearing assembly mounted on the first named portion and a second portion, said second portion being carried on the bearing assembly and being provided with means for holding against rotation with the shaft whereby force may be transmitted to the clutch throw-out structure, a hollow, drumlike structure secured to the flanged shaft, a second drumlike structure surrounding said first structure spaced radially therefrom, said structures having driving teeth respectively on the outer surface of the inner structure and the inner surface of the outer structure, a plurality of clutch plates mounted between said drum structures being alternately engaged with the respective drum structures, an annular securing member for holding the plates in position at the attaching end of the inner drum structure, said member having spaced lugs for attachment to the drum structure and the flange on the shaft having spaced cut-away portions to accommodate said lugs whereby the flange can be removed from the drum structure for removal of the clutch assembly without removing the clutch plate securing member, a clutch disk packing structure including an annular member engageable with the clutch plates and portions extending radially inwardly, said inner drum structure being provided with openings through which said portions project, a spring retaining member mounted within the inner drum structure and secured to said portions, and a spring abutting said member and the inner axial face of the drum structure, said outer drum structure being removably secured to the flanged driven member for permitting removal of the clutch assembly, said inner drum structure being provided with a portion journaled in the axial face portion of the outer drum structure to provide a pilot bearing.

13. A clutch device for a power transmitting device having an internally splined driving member and a driven member formed with an attaching flange comprising, a splined shaft slidably fitted in said splined member, said shaft being formed with an attaching flange, a clutch actuating structure mounted for axial movement with respect to said shaft, said structure having associated therewith a clutch actuating element extending through the flange, a removable clutch unit including a plurality of clutch plates, an outer drum structure to which alternate clutch plates are drivingly connected, an inner drum structure to which alternate plates are drivingly connected, means for connecting the flange on the splined shaft to the inner drum structure, means for connecting the outer drum structure to the flange of the driven member, and means carried by the inner drum structure and operably engageable by the clutch actuating element for resiliently urging the clutch plates into driving relationship.

RUSSEL D. ACTON.